R. R. DIETRICH.
SEAM FORMING MACHINE FOR SHEET METAL WARE.
APPLICATION FILED JAN. 14, 1914.

1,113,205.

Patented Oct. 13, 1914.
3 SHEETS—SHEET 1.

WITNESSES:
Harry A. Beinel

INVENTOR.
Richard R. Dietrich
BY
Emil Starek
ATTORNEY.

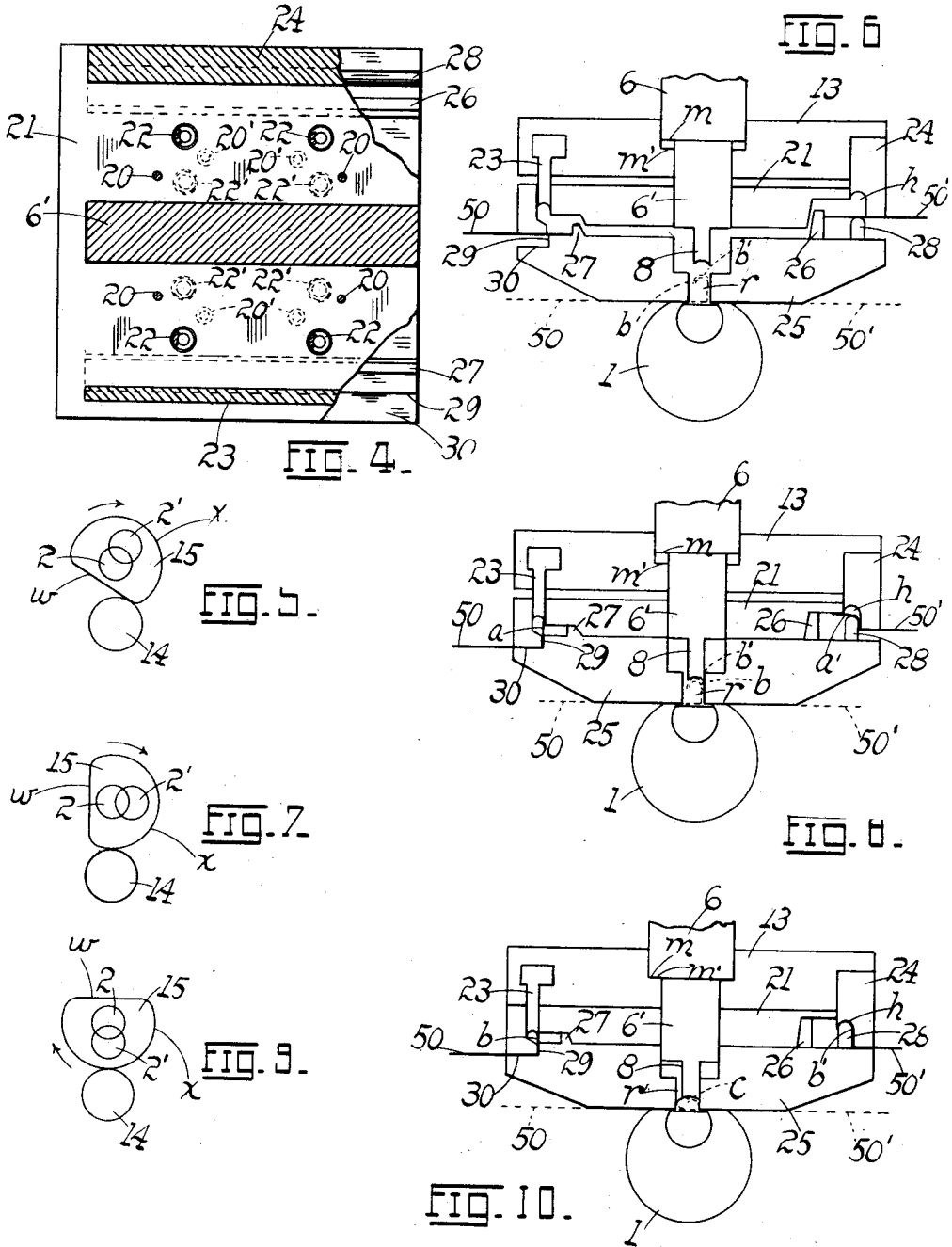

R. R. DIETRICH.
SEAM FORMING MACHINE FOR SHEET METAL WARE.
APPLICATION FILED JAN. 14, 1914.
1,113,205.   Patented Oct. 13, 1914.
3 SHEETS—SHEET 3.
Fig.11.   Fig.12.
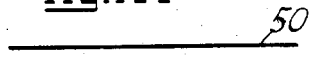
Fig.13.   Fig.14.
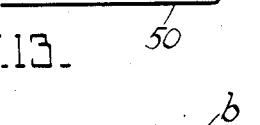
Fig.15.   Fig.16.
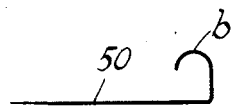
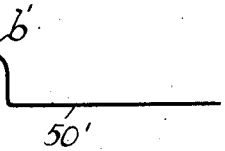
Fig.17.
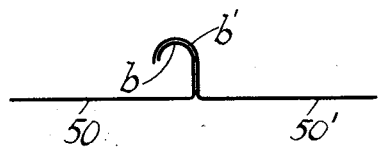
Fig.18.
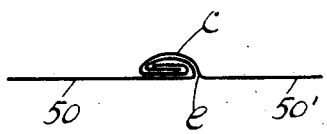
Fig.19.
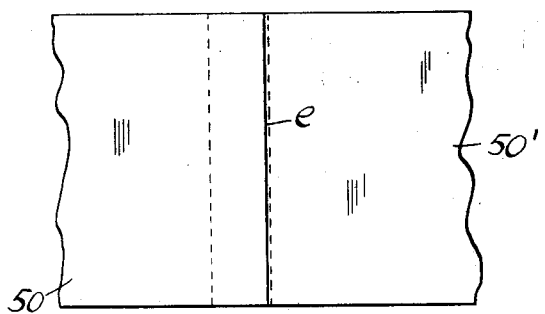
Fig.20.
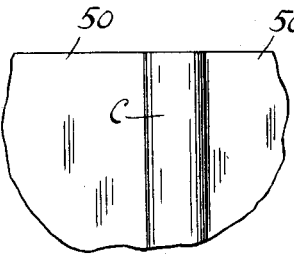
WITNESSES:
Harry A. Bennett
Fannie E. Weber
INVENTOR.
Richard R. Dietrich
BY
Emil Starek
ATTORNEY.

UNITED STATES PATENT OFFICE.

RICHARD R. DIETRICH, OF ST. LOUIS, MISSOURI.

SEAM-FORMING MACHINE FOR SHEET-METAL WARE.

1,113,205.  Specification of Letters Patent. Patented Oct. 13, 1914.

Application filed January 14, 1914. Serial No. 812,032.

*To all whom it may concern:*

Be it known that I, RICHARD R. DIETRICH, citizen of the United States, residing at St. Louis, State of Missouri, have invented certain new and useful Improvements in Seam-Forming Machines for Sheet-Metal Ware, of which the following is a full, clear, and exact description, reference being had to the accompanying drawings, forming a part hereof.

My invention has relation to improvements in seam-forming machines for sheet metal ware; and it consists in the novel details of construction more fully set forth in the specification and pointed out in the claims.

Figure 1:
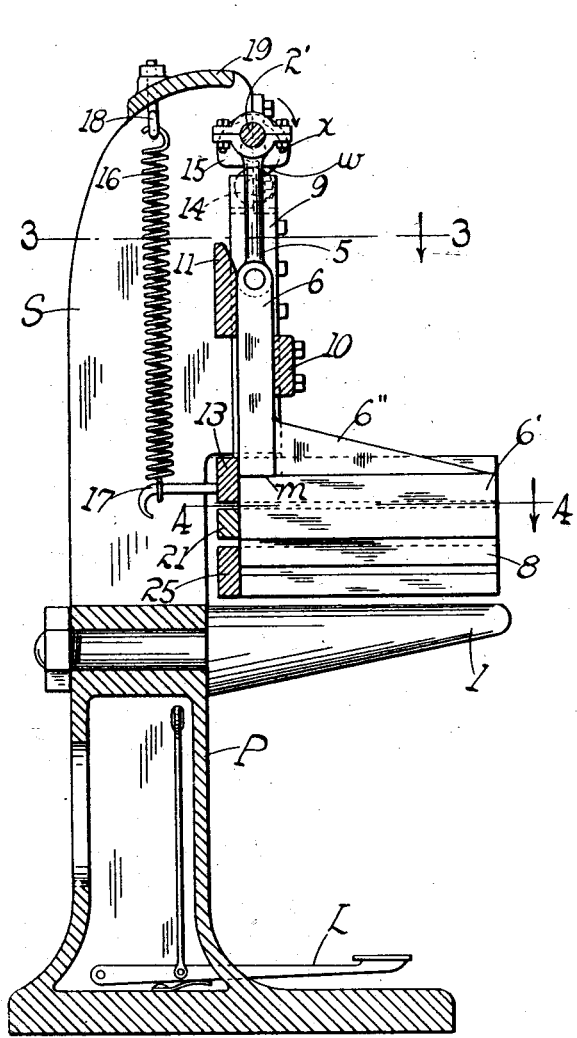
Figure 2:
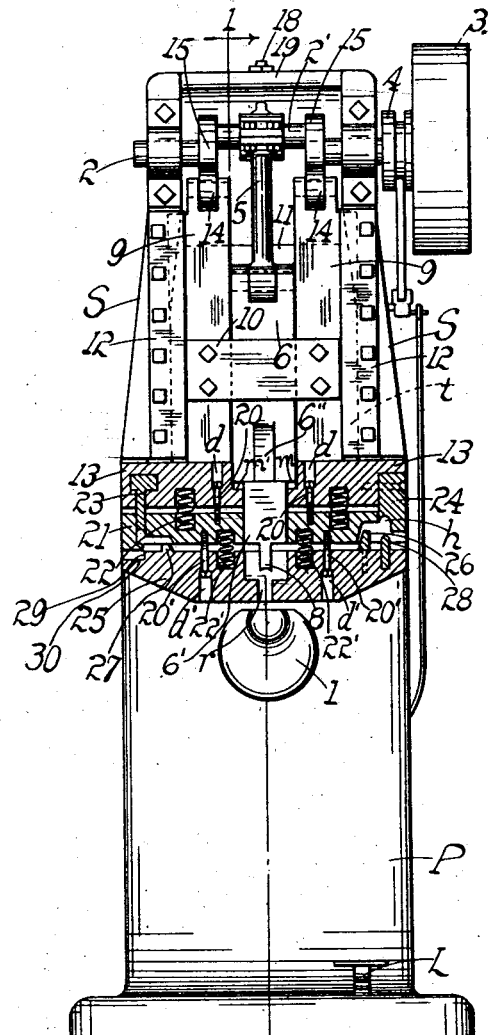
Figure 3:
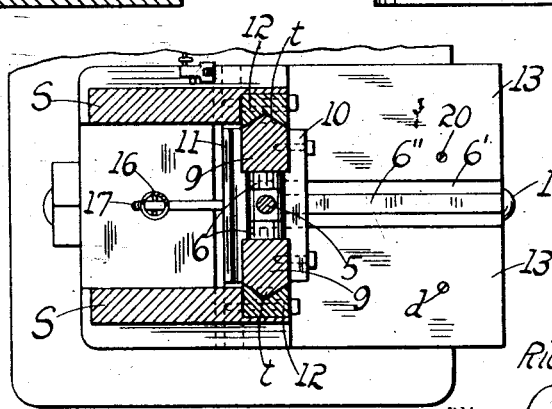

In the drawings, Figure 1 is a vertical longitudinal section of the machine on the zig-zag line 1—1 of Fig. 2 with the movable parts raised to highest position; Fig. 2 is a front elevation of the machine, the forming members being in section; Fig. 3 is a horizontal section on the line 3—3 of Fig. 1; Fig. 4 is a horizontal section on the line 4—4 of Fig. 1; Fig. 5 is a diagrammatic view illustrating the position of the cam-crank-disk for a partial downstroke of the seam-forming members; Fig. 6 is a diagrammatic view illustrating the relative positions of the seam-forming members when the cam crank-disk occupies the position shown in Fig. 5; Figs. 7, 8, 9, and 10 are diagrammatic views illustrating subsequent stages or positions of the cam-disk and seam-forming members respectively; Figs. 11 to 17 are cross-sectional diagrammatic views showing the various stages of development of the seam; Fig. 18 is a cross-sectional view of the finished seam; Fig. 19 is a bottom plan of the plates or sheets joined together by the finished seam; and Fig. 20 is a top plan of the sheets showing the finished seam.

The present invention is directed to improvements in machines by which the seams of sheet metal vessels, and similar ware are formed, the object of the invention being to provide a machine which is capable of forming a seam which is new in the art so far as I am aware, and which forms the subject-matter for a distinct application for patent.

A further object is to provide a machine of the character described which will form the seam with a minimum number of operations; one which is rapid thereby having a maximum capacity; one which is simple in construction, durable, compact, and one possessing further and other advantages better apparent from a detailed description of the invention which is as follows:—

Referring to the drawings, P represents a suitable pedestal to which is secured at a convenient point a support or "horn" 1 for the support of the assembled edges of the metal or other stock in which the finished seam is formed or set, said "horn" being a member well known in the art. Leading from the sides of the pedestal are standards S, S, between which at the front of the machine is mounted a crank shaft 2 to which rotation is imparted from a belt pulley 3 as well understood in the art, the pulley being coupled to and uncoupled from the shaft by means of a clutch member 4 controlled from a pedal-lever L through suitable intermediate connections not necessary here to describe because understood by every skilled mechanic, and shown here more or less conventionally. To the wrist-pin 2' of the shaft is coupled one end of a connecting rod 5, the opposite end thereof being pivotally connected to a central plunger 6, the base of the plunger terminating in a forwardly projecting horizontal arm 6' extending over the horn 1, the arm being strengthened by a rib 6" leading from the base of the plunger. The bottom of the arm 6' is provided with a seam-finishing punch or "setter" 8 as shown.

Disposed on opposite sides of the plunger 6 are complementary plungers 9, 9, connected on opposite faces by the cross plates 10, 11, respectively, said plates serving as guides for the plunger 6 operating between the side plungers 9, 9, the plate 10 being removable. The side plungers are provided with tongues *t*, *t*, which operate in corresponding grooves of the gibs or guides 12, 12, bolted to the standards S, S, the latter being suitably recessed to bring the gibs flush with the front faces or edges of the standards (Fig. 3). The plungers 9, 9, lead from a suitable base-plate or platform 13, suitably grooved and recessed for the free traverse therethrough of the arm 6' of the middle plunger 6 (Fig. 2), the said platform reciprocating as a unit with the plungers (9, 9). The upper ends of the plungers 9, 9, terminate in anti-friction rollers 14 which are traversed by the crank-disks 15 on the shaft 2, the disks 15 being cam-shaped (see Figs. 1, 5, 7, 9) so that they serve the functions of crank-disks and cams, and are virtually cam-crank-disks. The cam formations of the disks 15 drive the plungers 9, 9, downward with the rotation of the crank-shaft 2, the plungers being restored to their normal or highest position by the tension of the compression spring 16 secured to an arm 17 on the back of the platform 13, and to an eye-bolt 18 on the bridge-member 19 connecting the upper ends of the standards S, S.

Suspended from the platform 13 by means of screws 20 deposited in suitable depressions $d$ in said platform, is an intermediate platform 21, a series of high-tension springs 22 deposited in suitable alining pockets of the respective platforms assisting gravity in maintaining the platforms apart, though said springs perform a special function to be presently referred to. Secured by means of a tongue and groove connection (or otherwise) to the platform 13 on one side is a seam-element former or punch 23, there being bolted or otherwise secured to the opposite side of the platform 13 a second seam-element former or punch 24, the platform being properly recessed to bring the side face of the member 24 flush therewith (Fig. 2). The former 23 is free to operate through the intermediate platform 21 as shown. Suspended from the platform 21 is a third and bottom platform 25, in said case the suspending screws 20' being screwed into the member 21, and inserted through depressions $d'$ in the bottom face of the member 25, the members 21 and 25 having interposed between them low tension compression springs 22' out of alinement however with the stronger springs 22. The platform 25 is suitably grooved and recessed to allow for the free play of the arm 6' and punch 8, the latter being free to traverse a recess $r$ in said bottom platform so as to coöperate with the horn 1. Disposed on the platform 25 on one side, and at a point beyond the member 24 is an abutment 26, a corresponding abutment 27 of less height being provided on the opposite side at a point inward and beyond the punch 23. The member 24 is provided with a recess or groove $h$ coöperating with a rib 28 on the platform 25, the latter being provided on the side opposite the rib with an offset or shoulder 29 leading from a marginal ledge 30, the several formations being involved in the formation of the resulting seam. Assuming that the reference numerals 50, 50' represent the ends of a piece of sheet metal or other stock, or the ends of two distinct sheets, the successive formations or seam elements impressed on the end 50 are represented by $a$, $b$, those impressed on the end 50' being represented by $a'$, $b'$. Upon assembling the parts or seam elements $b$, $b'$, (Fig. 17) the final impression by the machine leaves a finished seam $c$ and a joint $e$ between the sheet-ends opposite the seam $c$. How these successive formations are made will be best understood from a description of the operation of the machine which is as follows: Reference to Figs. 1 and 2 shows that the wrist-pin 2' is at its highest position, thus pulling the connecting rod 5 to its upper limit. At the same time the flat faces $w$ of the cam-disks 15 have been turned opposite the rollers 14, thus allowing the spring 16 to pull the plungers 9, 9, and their suspended platforms to their highest position, the several platforms 13, 21, 25, being spaced apart, and the bottom platform 25 being lifted off the horn or abutment 1 (Fig. 2). When the parts are in this position, the operator inserts the ends of the stock (50, 50') respectively over the platform 25 on one side against the abutment 27, and across the rib 28 against the abutment 26 on the opposite side (Fig. 6) and by depressing the pedal L throws the clutch 4 in proper direction to couple the pulley 3 to the shaft 2 whereupon rotation is imparted to the shaft (see arrows Figs. 5, 7, 9), causing the plungers 6 and 9, 9, to participate in a downstroke. At the first stage of such downstroke the platform 25 is forced against the horn 1 (Fig. 6); at the next stage the weaker springs 22' are compressed and the platform 21 is forced against the platform 25 (arrested by the horn 1) as shown in Fig. 8. With the movement of the member 21 against the member 25 as described, the ends of the sheets 50, 50', are bent so as to form the flange $a$ on the sheet 50 (Fig. 13) and the curved element or flange $a'$ (Fig. 14) on the sheet 50' (Fig. 8). As the rotation of the shaft continues the plungers 6 and 9, 9, keep descending until at the next stage of the downward strokes thereof the stronger springs 22 are compressed, and the platform 13 is forced against the platform 21 (Fig. 10). In this movement the elements $a$, $a'$, are bent into the elements $b$, $b'$, (Figs. 10, 15, 16). The forcing of the member 13 against the member 21 is not done by the cams 15, but by the plunger 6 for the following reason: After the member 21 has been forced against the member 25 by the cams (Fig. 8) the circular or concentric portion $x$ of the cam rides over the roller 14, such circular portion ceasing to depress the roller, and while the portion $x$ is riding over the roller the platform 13 remains stationary or ineffective until forced down by the plunger 6 coupled to the wrist-pin 2', which plunger of course, continues to descend. As the plunger descends the shoulder $m$ thereof encounters the ledge or complementary shoulder $m'$ on the platform 13 driving the latter against the member 21 and thus compressing the springs 22. It follows therefore that the seam-elements $b$, $b'$, are started by the approach of the members 21, 25, resulting in the preliminary bends $a$, $a'$, and are finished by the approach of the members 13, 21, the formers 23 and 24 with their respective coöperating members 27, 29, 30, and 28, h, bringing the elements b, b', into the desired form for assembling (Fig. 17) preparatory to squeezing the same into the finished seam c.

After the plunger 6 has reached its lowest position and driven the platforms 13 and 21 together, the shaft 2 continues its rotation (Fig. 9) and the plunger 6 is lifted by the wrist-pin 2', whereupon the pressure on the springs 22 is relieved and the platform 13 is lifted under the action of the lifting spring 16, thus restoring the parts as shown in Fig. 8. With further rotation of the crank-shaft, the edge w of the cam is brought opposite the roller 14, thus releasing the pressure on the weaker springs 22', the spring 16 still further lifting the platform 13 to allow the springs 22' to expand, and the parts are restored to the position in Fig. 6, the wrist-pin 2' of course raising the plunger 6 to its highest position. This completes the cycle of operations involved in the formation of the seam-elements b, b'. Thereupon these are assembled by hand (or otherwise) as shown in Fig. 17, the operator placing the assembled parts on the horn 1 directly beneath the recess r of the member 25. With the next downward stroke of the plunger 6, the same movement and depression of the platforms 13, 21, 25, occurs except that on this second downward stroke no stock is fed between the members 21, 25, said stroke being utilized to finish the seam c. With the full downward stroke of the plunger 6, the punch 8 encounters the assembled seam-elements b, b', deposited on the horn 1, and squeezes them into the shape shown in section in Fig. 18. It follows therefore that it requires two revolutions of the shaft 2 to complete a seam, the first being utilized for forming or bending the elements b, b', into proper form, and the second to squeeze the assembled elements into the completed seam. Two of the platforms 21, 25, are actuated in one direction directly by the cams 15, whereas the upper one 13 is actuated by the plunger 6. The cams 15 drive the member 25 against the horn 1, and then the member 21 against the member 25 to effect the preliminary bends or elements a, a', the plunger then forcing the member 13 against the member 21 thus completing the bends b, b'. These members (13, 21, 25) are lifted or restored to their normal positions by the spring 16. When thus restored the stock (50, 50') with its elements b, b', may be readily withdrawn from between the members 21, 25, by drawing the same forward and outward along the ledge 30 and rib 28, after which the parts b, b', may be readily and instantlly assembled for depositing on the horn 1 below the recess r, to be squeezed with the next downstroke of the plunger 6 and its punch 8.

It may be stated in passing that the reason the cams 15 drive the member 21 against the member 25, without driving the members 13 and 21 together, is because under the initial pressure exerted on the member 13 by the cams, the weaker springs 22' will yield without affecting the more powerful springs 22. These latter are finally compressed when the member 13 is driven against the member 21 by the plunger 6. The platforms 13, 21, 25, may be designated as seam-element forming members, because forming the elements b, b', while for convenience the member 6 may be designated as a seam finishing or setting member, its function (among others) being to finish or "set" the seam c. Features illustrated but not alluded to are well understood in the art and require no description in the present connection.

Having described my invention, what I claim is:—

1. In a seam forming machine, a suitable support for the stock, a pair of seam-element forming members loosely coupled together and normally spaced apart and operating to and from said stock-support, and a seam-finishing member traversing the seam-element forming members and coöperating with the stock support.

2. In a seam forming machine, a suitable member for the support of the stock, a pair of seam-element forming members normally spaced apart, compression springs interposed between said members, a third coöperating seam-element forming member reciprocating to and from the stock-support for actuating the first mentioned seam-element forming members, springs interposed between said actuating member and the adjacent seam-element forming member, and a seam-finishing member operating through the seam-element forming members and actuating member, and coöperating with the stock-supporting member.

3. In a seam forming machine, a suitable member for the support of the stock, a pair of seam-element forming members normally spaced apart, a third coöperating seam-element forming member reciprocating to and from the stock-support and actuating the first mentioned seam-element forming members, and a seam-finishing member traversing the seam-element forming members and actuating member, and controlling said actuating member, and coöperating with the stock-supporting member.

4. In a seam forming machine, a suitable member for the support of the stock, a pair of seam-element forming members normally spaced apart for the reception of the stock, a third coöperating seam-element forming member reciprocating to and from the stock-support and spaced from the adjacent member of the pair aforesaid and actuating said pair, an abutment on one side of a face of one of the pair of the first mentioned seam-element forming members, a rib spaced from said abutment, a marginal ledge formation on the opposite side of said member, an offset leading therefrom toward the adjacent member of said pair, an abutment at a suitable distance from said offset, punches on the third seam-element forming member coöperating with the abutments, rib, ledge, and offset aforesaid, to form the component elements of the seam, a seam-finishing member traversing the several seam-element forming members and controlling the actuating member, and a punch on said finishing member coöperating with the stock supporting member to set the seam upon the assembling of the seam components.

5. In a machine of the character described, a suitable support for the stock, a cam-crank shaft, a plunger coupled to the wrist-pin of the crank, complementary plungers actuated by the cams and disposed on opposite sides of the first mentioned plunger, seam-element forming members loosely coupled together and actuated by the side plungers, and means on the first mentioned plunger for effecting control of said seam-element forming members independent of the actuation thereof by the complementary plungers.

6. In a machine of the character described, a cam crank-shaft, a central plunger coupled thereto, complementary plungers actuated by the cams and disposed on opposite sides of the central plunger, a supporting member for the stock, a pair of seam-element forming members normally spaced apart and adapted to be forced against the stock-supporting member by the cam-operating plungers, a third seam-element forming member actuated by the cams and normally spaced apart from the pair aforesaid, the several elements being traversable by the central plunger, means on said plunger for driving the third seam-element forming member against the aforesaid mentioned pair of members, and a seam-finishing punch on said central plunger coöperating with the stock-supporting member.

7. In a machine of the character described, a suitable support for the stock, a rotatable crank-shaft, having crank-disks provided with cam-formations, a seam-element forming member actuated by said cam-cranks, a pair of complementary seam-element forming members coupled to, and actuated by, said first mentioned member, and normally spaced apart from one another and from said first mentioned member, and a crank-operated seam finishing member controlling said actuating member and its complementary seam-element forming members.

8. In a machine of the character described, a rotatable crank-shaft, having crank-disks provided with cam formations, a suitable stationary support, a seam-element forming member actuated in one direction by said cam-disks, a spring fixed to the support and member respectively for actuating the latter in the opposite direction, a pair of complementary seam-element forming members coupled to, and actuated by, said first mentioned member, the several members being normally spaced apart and movably coupled to one another, springs of a given tension interposed between the first member and the adjacent member of the complementary pair of members, springs of a lower tension interposed between the members of the complementary pair of members, a support for the stock, and a finishing plunger actuated by the crank-shaft and operating to drive the first mentioned seam-element forming member against the complementary pair of members, and a punch on said plunger traversing the member in immediate engagement with the stock support, for setting the seam.

9. In a machine of the character described, cam - and - plunger - actuated seam - element forming members loosely coupled together, a plunger traversing said members for finishing or setting the seam, a suitable support for the stock, and yielding devices interposed between the respective members at suitable distances from the path of the plunger.

10. In a machine of the character described, a crank-shaft provided with cam-cranks, a reciprocating plunger coupled to the wrist-pin of the shaft, a series of seam-element forming members actuated conjointly in one direction by the cam-cranks, means interposed between the plunger and one of the members of the series of seam-element forming members for actuating said member in the same direction directly by the plunger, means for maintaining the members of said series of seam-element forming members spaced apart during a stroke of the plunger in the opposite direction, and means for supporting the stock.

In testimony whereof I affix my signature, in presence of two witnesses.

RICHARD R. DIETRICH.

Witnesses:
EMIL STOREK,
FANNIE E. WEBER.